US006824752B1

(12) United States Patent
Terbot et al.

(10) Patent No.: US 6,824,752 B1
(45) Date of Patent: Nov. 30, 2004

(54) PROCESS AND SYSTEM FOR PURIFYING GASES

(75) Inventors: Charles Edward Terbot, Tonawanda, NY (US); Andrew Christopher Mackie, Orchard Park, NY (US)

(73) Assignee: Praxair Technology, Inc., Danbury, CT (US)

( * ) Notice: Subject to any disclaimer, the term of this patent is extended or adjusted under 35 U.S.C. 154(b) by 259 days.

(21) Appl. No.: 10/175,293

(22) Filed: Jun. 20, 2002

(51) Int. Cl.[7] ............................ B01D 47/00; B01J 8/00
(52) U.S. Cl. ..................................... 423/210; 423/659
(58) Field of Search ................................. 423/210, 659

(56) References Cited

U.S. PATENT DOCUMENTS 4,325,921 A * 4/1982 Aiken et al. ................. 423/210
5,118,629 A * 6/1992 Quiros et al. ................. 436/55
5,817,521 A * 10/1998 Kato ............................ 436/151
6,068,685 A    5/2000 Lorimer et al. ............... 96/112
6,168,645 B1   1/2001 Succi et al. ...................... 95/8

* cited by examiner

*Primary Examiner*—Stanley S. Silverman
*Assistant Examiner*—Jonas N. Strickland
(74) *Attorney, Agent, or Firm*—Iurie A. Schwartz

(57) ABSTRACT

This invention is directed to a system and a process for protecting a gas purification system from damage comprising passing a stream of impure gas through a catalyst bed and measuring the temperature difference before and after the catalyzed bed reaction through a data analyzer to determine the impurity of the gas prior to controlling the feed of impure gas into or out of a reactor for producing a purified gas. In a preferred embodiment, the catalytic beds may be in parallel form, and the plurality of temperature measurements before and after the catalytic beds is considered by a data analyzer for controlling the impure gas for feeding into the purification reactor.

16 Claims, 2 Drawing Sheets

PROCESS AND SYSTEM FOR PURIFYING GASES

FIELD OF THE INVENTION

This invention generally relates to a system for protecting a gas purification system from damage. In particular, this invention is directed to a process and system for operating an ultra high purity gas purifier using a getter while minimizing the chance for damage to the gas purification system.

BACKGROUND OF THE INVENTION

Ultra-high purity (UHP) gas purification systems are used to supply customers with UHP nitrogen. The initial source of nitrogen (the distillation plant, or the liquid nitrogen supply) typically contains impurities including about 1 ppm oxygen by volume. The oxygen level is checked by an oxygen analyzer before passing into the gas purification vessel, which contains material that reacts with impurities in the nitrogen to produce purified gas.

Ultra-high purity inert gas purification systems generally employ a chemically-reactive getter metal that is comminuted by some means, and then dispersed in a matrix of a comparatively inert substrate material (usually alumina or similar). Once activated by a reduction process of some kind, this high surface area metal can then react extremely rapidly with various impurity gases (oxygen, hydrogen and others, depending on the getter material and temperature) to chemically bond with such gases, and so remove them from the gas stream: a process known as chemisorption.

The speed of the reaction, plus its highly exothermic (heat-evolving) nature means that processing inert gases containing high levels of a reactive impurity may cause significant damage and personal danger. For example, it is known that exposing activated nickel-based getters to oxygen concentrations greater than 1% will generally cause heat-damage to the catalyst, and possibly also to the reactor vessel and downstream customer equipment. The cost of the damage in such an instance ranges from tens of thousands to millions of dollars, when accounting for the impact on downstream processing.

One safety scheme is to measure the temperature of the catalytic bed using judiciously placed temperature measuring devices, such as thermocouples. If the bed temperature rises due to exothermic reactions, action is taken to safeguard the bed. This action will typically consist of diverting the feed gas and venting the purifier to rid it of remaining reactive gases and preventing additional reactive gases from entering. This will typically be performed automatically using a control unit that recognizes that a temperature setpoint has been reached and actuates valves to the shutdown condition. A major problem with this approach is that it requires that the bed be exposed to high levels of reactive impurities before action is taken, since this is necessary to raise the temperature of the bed.

Another safety scheme is to sample the gas stream prior to entering the bed. When a predetermined level of contaminants is reached, typically orders of magnitude above that normally present in the feed gas, action is taken to safeguard the bed. There are several types of impurity-level monitoring device. Typically, commercially available gas analyzers can be used. The approach of measuring the gas stream prior to entering the bed has the advantage that it can potentially allow more rapid reaction than an approach using thermocouples placed inside the purifier that is being protected, i.e., it can take action to safeguard the bed before the bed is exposed to high levels of reactive species. Further, it is possible to detect levels of reactive species that are higher than normal operation but are below that required to raise the temperature of the bed significantly. Thus, it is possible to design a system that is more sensitive to reactive species than one that simply embeds thermocouples inside the purifier bed and waits for these to register an increase in temperature.

One drawback to this approach is the cost of the unit, both in terms of the initial purchase cost and the maintenance required to keep the analyzer in good working order. For example, oxygen is commonly the species from which the purifier must be protected. Two standard varieties of oxygen-detection cell provide an electrical current output from either (i) a cell that operates at ambient temperature, containing salt solution that needs to be maintained at a fairly constant level by continuous replenishment with deionized water or new salt solution, or (ii) a zirconia ($ZrO_2$) cell maintained at high temperature (greater than 600° C.), that has a typical lifetime of two years or less.

The cost of using analysis external to the bed is compounded by the need to protect the gas from a backflow condition. Backflow may occur due to errors in operation or piping hook-up, or as a result of upset conditions that cause the pressure within the purifier to be lower than the pressure in what is usually the downstream direction and thus cause gas to enter the bed in a direction counter to that during normal operation. Protection against backflow requires that both the stream entering and leaving the purifier must be sampled. This increases cost and reduces system reliability by requiring two measuring devices as opposed to one.

It is therefore a priority to ensure (by monitoring) that such instances are avoided. An ideal system to achieve (or monitor) this will have three main features. It must 1) respond rapidly to increases in impurity level; 2) be easily maintained and operated, and 3) be cost effective enough to allow several redundant analyzers to be employed to monitor reactive impurities in the gas stream. This redundancy guarantees superior reliability, which is necessary to minimize the risks, both personal and financial, as discussed above.

Some prior art references have attempted to provide a system that attempts to safeguard the getter. U.S. Pat. No. 6,168,645B1 discloses a safety device located both up and downstream of the getter. The safety device contains getter material, along with thermocouples. This patent discloses a method of detecting impurities in gases by their reaction with a purification material that exhibits an exothermic reaction when an impure gas is passed over it. The resultant change in temperature is then detected by various means, including measuring the temperature of the gas using a thermocouple, or melting of the purification material. Once a certain temperature has been reached, a control system is then triggered, to cause it to carry out remedial action.

However, the '645 patent has a significant disadvantage in that a continual low level of impurity will eventually consume the purification material, and will cause a gradual reduction in both the speed and the level of response (smaller change of temperature) to increases in the impurity concentration. For example, it is well known in the industry that a container filled with activated nickel getter has a limited capacity to react with oxygen, hydrogen and other impurities. The oxidation reaction is:

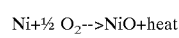
$Ni + \frac{1}{2} O_2 \rightarrow NiO + heat$

However, once all the nickel has reacted in this way, there will be no further heat output by the purification material, regardless of how high the oxygen concentration is in the gas or other fluid passing over it.

It is believed, therefore, that the '645 patent may be practiced only if there is the capability for either regeneration or replacement of the purification material. The condition of the purification material must itself be monitored to ensure that the safety device will give the appropriate response when exposed to excessive amounts of impurity.

U.S. Pat. Nos. 6,068,685 and 6,156,105 disclose protecting the purifier both upstream and downstream. A first temperature sensor is disposed in a top portion of the getter material that constitutes the purifier bed. The first temperature sensor is located in a melt zone to detect rapidly the onset of an exothermic reaction which indicates the presence of excess impurities in the incoming gas to be purified. A second temperature sensor is disposed in a bottom portion of the getter material. The second temperature sensor is located in a melt zone to detect rapidly the onset of an exothermic reaction, which indicates that excess impurities are being backfed into the getter column. Action is taken to protect the bed if the setpoint is exceeded in either thermocouple.

However, the '698 patent does not disclose any means of preventing impurity intrusion into the getter reaction vessel. Catalyst is not employed. A reactant/impurity reaction is not employed. The differential temperature of input gas and output gas is not measured, only the absolute temperature of the getter material at the top and/or bottom of the vessel.

A technique known in the art to detect hydrogen at above its lower explosive limit (LEL) in air is from a MSA Instrument Model 5100 instrument. This instrument uses a pair of heated filaments, one of which is surface-treated with catalyst to speed the oxidation of fuel-gas present in air. This instrument, however, does not disclose the addition of a reactant to a fluid stream, but merely relies on the natural presence of a stoichiometrically-excessive amount of oxygen in air to act as the oxidizing reactant.

There is therefore a need in the art to prevent damage to the getters during the purification process. As such, safety schemes have been devised to protect the bed from excessive levels of contaminant, and thus excessively high temperatures.

SUMMARY OF THE INVENTION

A process for purifying an impure gas to produce a purified gas in a gas purification system and protecting the system from damage comprising passing a first impure gas stream into a data analyzer flow scheme and a gas purification apparatus; passing a second reactant-containing gas stream into the analyzer flow scheme; mixing the first impure gas stream with the second reactant-containing gas stream to form a mixed gas stream; passing the mixed gas stream to a first temperature measuring device to determine its temperature and passing the resulting temperature data to a data analyzer; passing the mixed gas stream from step d) to a catalytic bed to allow the reaction in the mixed gas stream to proceed and forming a reacted mixed gas stream; passing the reacted mixed stream to a second temperature measuring device to determine its temperature and passing the resulting temperature data to the data analyzer; and controlling the flow of the first impurity containing gas stream passing to or from the gas purification apparatus based on data received from the data analyzer. In one particular embodiment, a plurality of measuring devices and catalytic beds in parallel is used to determine the temperature of the reaction in the catalytic beds. Preferably, two or more sets of measuring devices and catalytic beds are used in parallel.

In another embodiment, this invention is directed to a process for purifying an impure gas to produce a purified gas in a gas purification system and protecting the system from damage, comprising passing a first impure gas stream into a data analyzer flow scheme and a gas purification apparatus; passing a second reactant-containing gas stream into the analyzer flow scheme; mixing the first impure gas stream with the second reactant-containing gas stream to form a mixed gas stream; separating the mixed gas stream into a plurality of split streams; passing one of the split stream to a first temperature measuring device to determine its temperature and passing the resulting temperature to a data analyzer; passing the resulting split streams from the previous step to a reaction vessel to purify the resulting split stream; passing the resulting split stream from the previous step to a second temperature measuring device to determine its temperature and passing the resulting temperature to the data analyzer; repeating the previous three steps with another split stream through corresponding temperature measuring devices and reaction vessels; and controlling the flow of the first impure gas stream passing to the gas purification apparatus based on data received from the data analyzer.

The present invention is also directed to a system for purifying an impure gas and protecting a gas purification system from damage comprising a first impure gas stream; a second reactant-containing gas stream; a reactor vessel; a plurality of temperature measuring devices to measure the temperature of the mixture of first impure gas stream and second reactant-containing gas streams before and after the gas flow in the reactor vessel; and a data analyzer for analyzing the temperature difference of the mixture of first impure gas stream and second reactant containing gas streams before and after the gas flow in the reactor vessel and controlling the flow of the first impure gas stream.

Both the first impure gas stream and the second reactant containing gas stream pass through flow control devices and pressure gauges. The temperature measuring device is preferably a thermocouple, but may be any device that can accurately measure the temperature of a gas. The reaction vessel may comprise a catalyst bed.

As used herein, a getter is defined as a solid material (usually metal) that reacts irreversibly with impurities ("gettering") in a fluid stream to eliminate those impurities from the stream.

As used herein, activation is defined as a process whereby the reaction products from the gettering process are removed from the getter, to allow the getter to be used once more to clean up the gas.

As used herein, a catalyst is a material that speeds up the establishment of an equilibrium.

As used herein, ultra-high purity (or UHP) is a term used to describe a gas that contains less than about 10 ppbv (parts per billion by volume) of each impurity.

BRIEF DESCRIPTION OF THE DRAWINGS

The invention is hereinafter described with reference to the following accompanying drawings in which.

DETAILED DESCRIPTION OF THE PREFERRED EMBODIMENT

The present invention has several aspects:
1) an impurity in a main fluid stream; 2) a second component, deliberately added to a sample taken, usually continually, from the main fluid stream; 3) a means of causing the exothermic reaction of the impurity in the main fluid stream with the second component; 4) a means of detecting the heat generated by the reaction; 5) a threshold delta T, which signals that the feed stream be prevented from entering the getter purifier (reactor).

The present invention has the two advantages that it (i) does not need regeneration or replacement under normal conditions of use, and (ii) is cheap enough to allow multiple units to be added to a system at low cost, to provide improved reliability for applications that demand constant operability (zero downtime).

Overall, the benefits can be summarized as: 1) improved reliability; 2) improved maintenance requirements; and 3) cost savings over conventional analytical methods.

The present invention provides a system whereby a first (impurity) component in a fluid stream is caused to react with a second, deliberately added, (reactant) component in a second fluid stream. This reaction generates heat, causing a change in temperature.

The resultant change in temperature is then detected by a variety of means, and used to trigger a corrective action. The first component of the fluid stream may be already present, or may be deliberately added, to allow the generation of heat from the exothermic reaction with the impurity.

Figure 1:
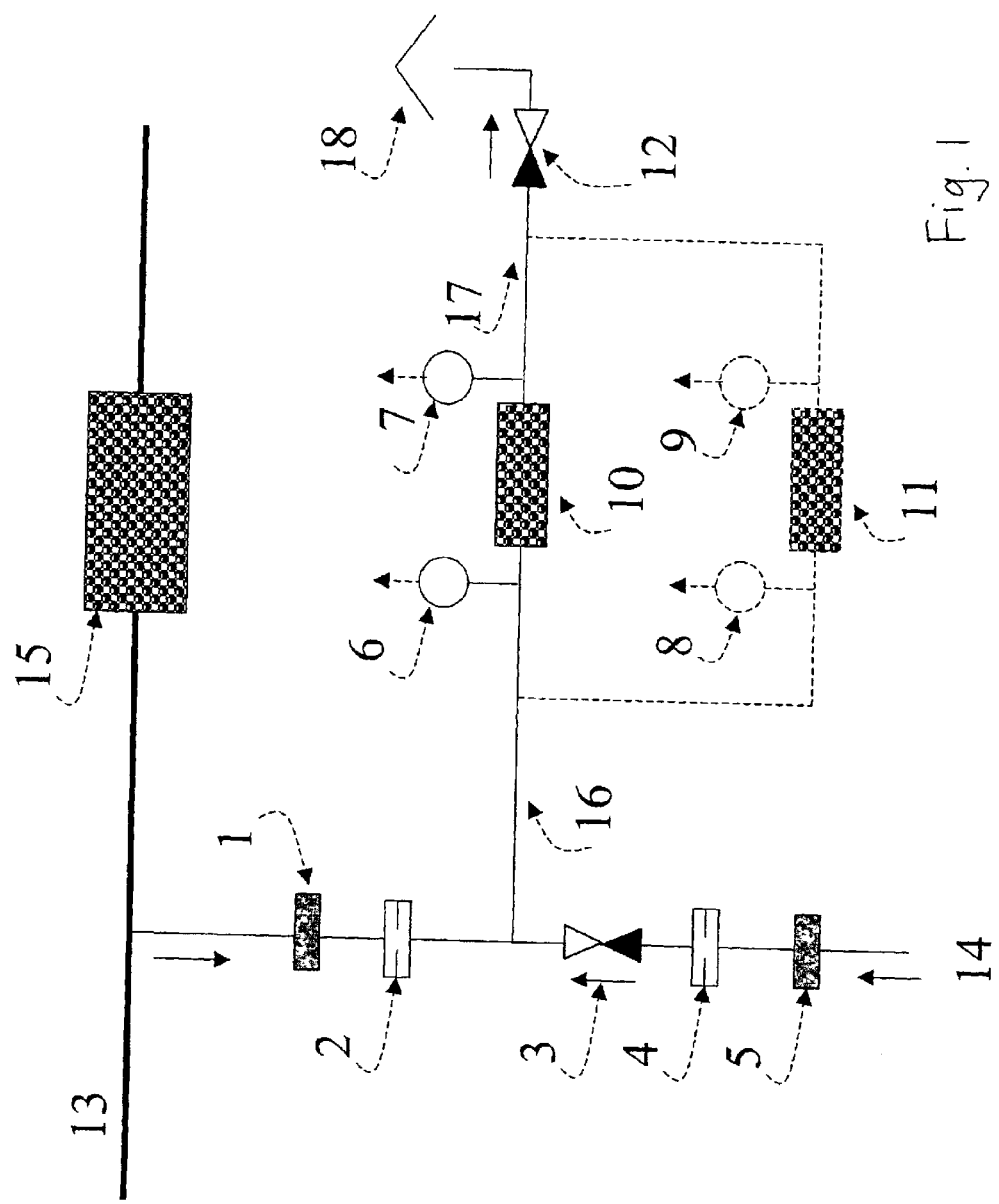
FIG. 1 is a schematic representation of the present system for purifying a gas, and monitoring the temperature of the gas before and after passing it through a catalytic bed to promote the impurity/reactant reaction and thereby determine the amount of impurities in the gas, and controlling the flow of gases into the reactor, and optionally, as provided in phantom, is another embodiment of the system having a plurality of catalytic beds to promote the reaction and thereby determine the amount of impurities in the gas.

A feed-forward oxygen sensor is used. That is, an oxygen-sensing device is used to monitor the oxygen concentration in gas passing into a reactive purifier. A process controller can then take appropriate actions to either control the process or shut down the system completely. FIG. 1 illustrates the process used to monitor oxygen levels in cryogenic nitrogen gas before or after it passes into the gas purifier vessel. Nitrogen gas generated in a plant or from a vaporized liquid supply flows along the pipeline into the reactor vessel, where impurities are removed by chemical reaction. Before the gas reaches the reactor vessel, its oxygen level is checked, to ascertain if it is below a certain limit. If the oxygen level is too high, then the control system takes actions to ensure that the reactor vessel is not exposed to the incoming gas, by shutting off both inlet and outlet valves to the purifier.

This process takes a sample of the feed stream and diverts it to mix with a second stream. The second stream contains a component that reacts with the impurity to cause an exothermic reaction. However, in order for the reaction to occur at room temperature, a catalyst is used. The mixed stream is passed through a tube containing the catalyst. In the event that the impurity is at too high of a concentration, the exothermic reaction will reach a delta T of above a selected threshold.

EXAMPLE 50 grams of a standard 1/16 inch diameter by 1/8 inch long cylindrical (0.5% palladium 99.5% alumina) catalyst in a 1.0 inch (outside-diameter) tube about 6 inches long, caused the temperature of a flow of nitrogen containing about 1,000 ppmv oxygen and an excess (about 0.3% by volume) of hydrogen to increase by about 12° C. The catalyst was necessary to ensure that the reaction occurs at room temperature:

$2H_2 + O_2 \rightarrow 2H_2O + Heat$ 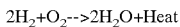

The gas input temperature ranged from about 20° C. to about 22° C. FIG. 1 shows an embodiment of the present invention. A first gas 13, which comprises the desired gas for processing and an amount of inert gas, is split into two separate streams: one stream feeding directly into and coming directly out of a getter-containing purifier 15 and another stream feeding to an analyzer flow scheme. Generally, first gas 13 is at a preferable pressure of between about 80 psig to about 170 psig, more preferably at a pressure of between about 90 psig and 160 psig, and most preferably at a pressure of between 100 psig and 150 psig. The analyzer flow scheme is composed of various filtering and flow-controlling devices, and in which a supply of a second gas 14, which comprises the desired gas and an amount of hydrogen gas, is combined with first gas 13, forming combined gas 16. Generally, second gas 14 is preferably at a pressure of between about 5 psig to 40 psig, more preferably between about 8 psig to about 23 psig, and most preferably between about 10 psig to about 25 psig.

First gas 13 which has been split toward the analyzer scheme passes through filter 1 and flow-controlling device 2, which contains a precisely-sized orifices from about 50 microns to about 100 microns in diameter to control the flow rate of the gas. Similarly, second gas 14 also passes through filter 5 and flow-controlling device 4 made of similar material. Additionally, second (reactant-containing) gas 14 then passes through valve 3, preferably a check valve, prior to joining gas 13 to form combined gas 16. Check valve 3 prevents back flow into the second gas line. The combined gas 16 is then passed to a thermocouple 6, then to a catalytic bed 10 to cause the reaction between the first gas 13 and second gas 14 to proceed, via an exothermic reaction. Another thermocouple 7 measures the temperature of combined gas stream 16 after the reaction. The waste second combined gas 17 is then passed to vent 18. The signal from thermocouples 6 and 7 ideally pass to transmitters (not shown), which digitize the data for transfer to a data analysis unit processing an algorithm.

FIG. 1, shown in phantom, is an embodiment having a plurality of thermocouples and catalytic beds in parallel shown relative to its corresponding set of thermocouples and catalytic beds. In this preferred embodiment, combined gas 16 is then passed through to a plurality of thermocouples 6, 7, then to a catalytic bed 10, 11, then finally to another set of thermocouples 7, 9, respectively. Devices 6, 7, 8, and 9 may be thermocouples, or other similar temperature measuring devices. Catalytic beds 10 and 11 contains palladium at from about 0.1% to about 1.0% by weight, on an inert substrate. Combined gas 16, after passing though thermocouples 7 and 9, is combined again forming second combined gas 17, which passes through valve 12, preferably a check valve, to prevent backflow of air into the catalytic beds 10 and 11, in the event of loss of gas supply pressure. The waste second combined gas 17 is then passed to vent 18. The signals from thermocouples 6, 7, 8, and 9 ideally pass to transmitters (not shown), which digitize the data for transfer to a data analysis unit processing an algorithm.

At selected levels, the algorithm will trigger shut down in getter-containing purifier 15, either on an excessive temperature differential (ΔT) across both of the catalytic beds 10 and 11, or an excessively rapid rise in temperature differential (d(ΔT)/dt).

Other devices known to the skilled artisan are also used, or may substitute for any of the devices disclosed above.

Figure 2:
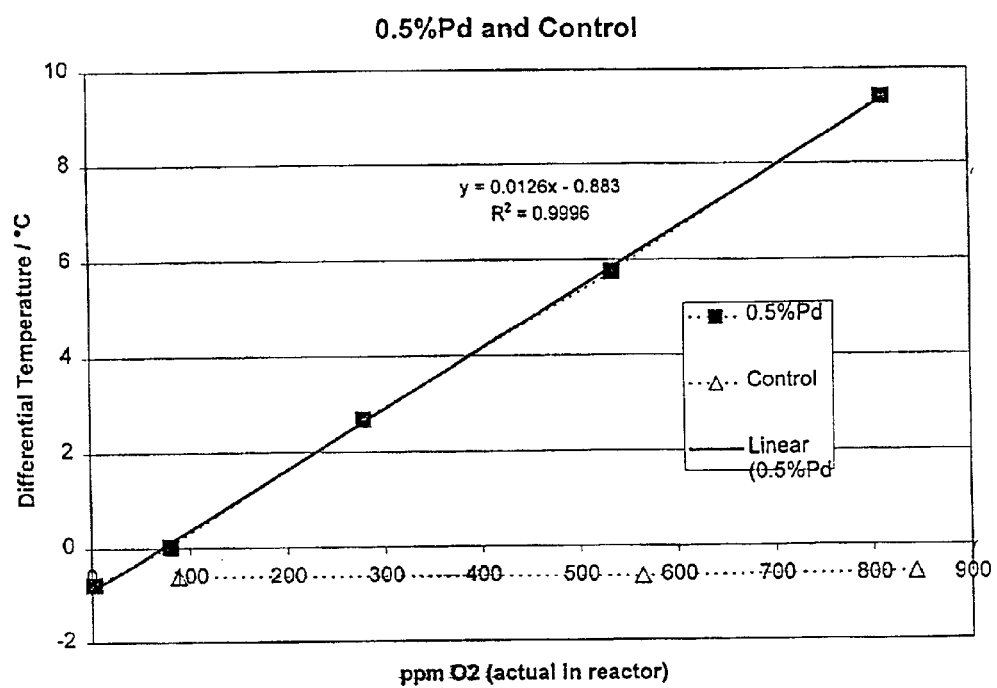
FIG. 2 is a graphical representation of the temperature difference for a 0.3% hydrogen in nitrogen stream versus oxygen level, with and without catalyst.

FIG. 2 shows a graphical representation of the temperature for a 0.3% hydrogen in nitrogen stream versus oxygen level, with and without catalyst.

Such a system may be used to monitor oxygen levels in purified gases, by adding a small bleed of hydrogen gas to a sample from the purified gas stream. The amount should be in excess of the stoichiometry of the expected reaction mixture. The temperature difference, DT, between the inlet (i) and outlet (o) temperatures (DT=T(o)−T(i)) can then be monitored. If the DT reaches+12° C., then the control system could take remedial action to prevent the 1000 ppm or higher oxygen impurity causing damage to the purification system.

Although this is one embodiment of the invention, others may be available. The ideal system is one that reacts most quickly and gives the largest temperature differential between the inlet and the outlet. Any system that has a low mass, such as a wire or a monolith, may have a distinct advantage over a bed of catalyst particles.

An insensitivity of the catalyzed reaction to temperature, particularly low temperature, will also be an advantage, as the temperature of the gas supplies may vary. The unit and its components must also be undamaged by exposure to high temperatures, such as may be encountered under extremely high impurity concentrations: however, careful selection of the concentration of the reactant fluid deliberately added to the supply is sufficient to prevent this occurrence.

Pure catalyst, catalyst-alloy or catalyst-coated wire may be suspended in the fluid stream. Its resistance or another physical property, or properties, can be monitored and compared to that of a non-catalyst-containing wire.

Such a catalyst-containing or -coated wire elucidated above may also change phase (i.e., melt or vaporize). Such a change may be readily monitored, for example, by measuring the electrical continuity.

Two thermocouples may be exposed to a fluid stream containing a reactive gas and an impurity. One thermocouple may contain, or be coated with, catalyst, and the other not. These thermocouples may have their output voltages (and hence, via calibration, their temperatures) measured and compared, so that at a predetermined difference in temperature, the purification control system acts to remediate the excessive impurity level. Such an arrangement would have the advantages of very rapid reaction times, due to the sensor's proximity to the reaction, combined with very low mass, and a tolerance of high temperatures.

In the above parameters the gas stream may be heated before or during exposure to the catalyst surface, to increase the rate of reaction. The catalyst-bearing surface may itself be directly heated to increase the rate of reaction. Further, a monolith, that is, a single catalyst-bearing structure with one or more channels in or on it, acts as a low mass and low pressure drop means of reacting two components of a fluid.

In an alternative embodiment, a reactor vessel temperature detecting device may be placed upstream of the reaction vessel.

The present invention would also be extremely useful as a guard against backflow into the standard cryogenic gas supply line, in the case that cryogenic nitrogen is used before purification, and may be contaminated with air, oxygen or another reactive gas. As such, a gas may contaminate a purified gas supply from a tie-in downstream, and the present invention may be used to prevent high reactant gas levels from reaching the gas purifier vessel.

A multiplicity of various parts of the current invention (several guard beds, several input, and/or output thermocouples and so on), or several units employing the entire invention may be used to further improve the reliability of the unit.

Although the example of oxygen as an impurity in nitrogen has been shown to be available, other applications for detecting oxygen in many inert gases, including argon, helium, and carbon dioxide are also available.

Furthermore, potential fuel gases, such as hydrogen, carbon monoxide, methane and non-methane hydrocarbons as impurities in inert gases may be detected by deliberately adding a small trace of (reactant) oxygen to the sample stream from the main inert gas supply.

Specific features of the invention are shown in one or more of the drawings for convenience only, as each feature may be combined with other ifeatures in accordance with the invention. Alternative embodiments will be recognized by those skilled in the art and are intended to be included within the scope of the claims.

What is claimed is:

1. A process for protecting a gas purification system from damage comprising:
   a) passing a first impurity-containing gas stream into a data analyzer flow scheme;
   b) passing a second reactant-containing gas stream into the analyzer flow scheme;
   c) mixing said first impurity-containing gas stream with the second reactant-containing gas stream to form a mixed gas stream;
   d) passing said mixed gas stream to a first temperature measuring device to determine its temperature and passing the resulting temperature data to a data analyzer;
   e) passing the mixed gas stream from step d) to a catalytic bed to allow the reaction in the mixed gas stream to proceed, and forming a reacted mixed gas stream;
   f) passing the reacted mixed stream to a second temperature measuring device to determine its temperature and passing the resulting temperature data to said data analyzer; and
   g) controlling the flow of the first impurity-containing gas stream passing to or from the gas purification apparatus based on data received from the data analyzer.

2. The process of claim 1 further comprising passing said first impure gas stream through a flow control device.

3. The process of claim 1 further comprising passing said second reactant-containing gas stream through a flow control device.

4. The process of claim 1 further comprising passing said first impure gas stream through a pressure gauge.

5. The process of claim 1 further comprising passing said second reactant containing gas stream through a pressure gauge.

6. The process of claim 1 wherein said temperature measuring device is a thermocouple.

7. The process of claim 1 wherein said reaction vessel comprises a catalyst bed.

8. The process of claim 1 wherein said catalyst bed is comprised of palladium on a substrate.

9. The process of claim 1 which comprises passing said mixed gas stream to a plurality of temperature measuring devices and catalytic beds in parallel to determine the temperature of the reaction in the catalytic beds.

10. A process for protecting a gas purification system from damage comprising:
   a) passing a first impurity-containing gas stream into a data analyzer flow scheme and a gas purification apparatus;

b) passing a second reactant-containing gas stream into the analyzer flow scheme;

c) mixing said first impurity-containing gas stream with the second reactant-containing gas stream to form a mixed gas stream;

d) separating the mixed gas stream into a plurality of split streams;

e) passing one of the split streams to a first temperature measuring device to determine its temperature and passing the resulting temperature to a data analyzer;

f) passing the resulting split stream from step e) to a reaction vessel to purify said resulting split stream;

g) passing the resulting split stream from step f) to a second temperature measuring device to determine its temperature and passing the resulting temperature to the data analyzer;

h) repeating the steps of e) to g) with another split stream through corresponding temperature measuring devices and reaction vessels; and i) controlling the flow of the first impurity-containing gas stream passing to the gas purification apparatus based on data received from the data analyzer.

11. The process of claim 10 further comprising passing said first impurity-containing gas stream through a flow control device.

12. The process of claim 10 further comprising passing said second reactant-containing gas stream through a flow control device.

13. The process of claim 10 further comprising passing said first impurity-containing gas stream through a pressure gauge.

14. The process of claim 10 further comprising passing said second reactant-containing gas stream through a pressure gauge.

15. The process of claim 10 wherein said temperature measuring device is a thermocouple.

16. The process of claim 10 wherein said reaction vessel comprises a catalyst bed.

* * * * *